(No Model.)
E. M. GRAHAM.
BICYCLE FRAME.
No. 541,811. Patented June 25, 1895.
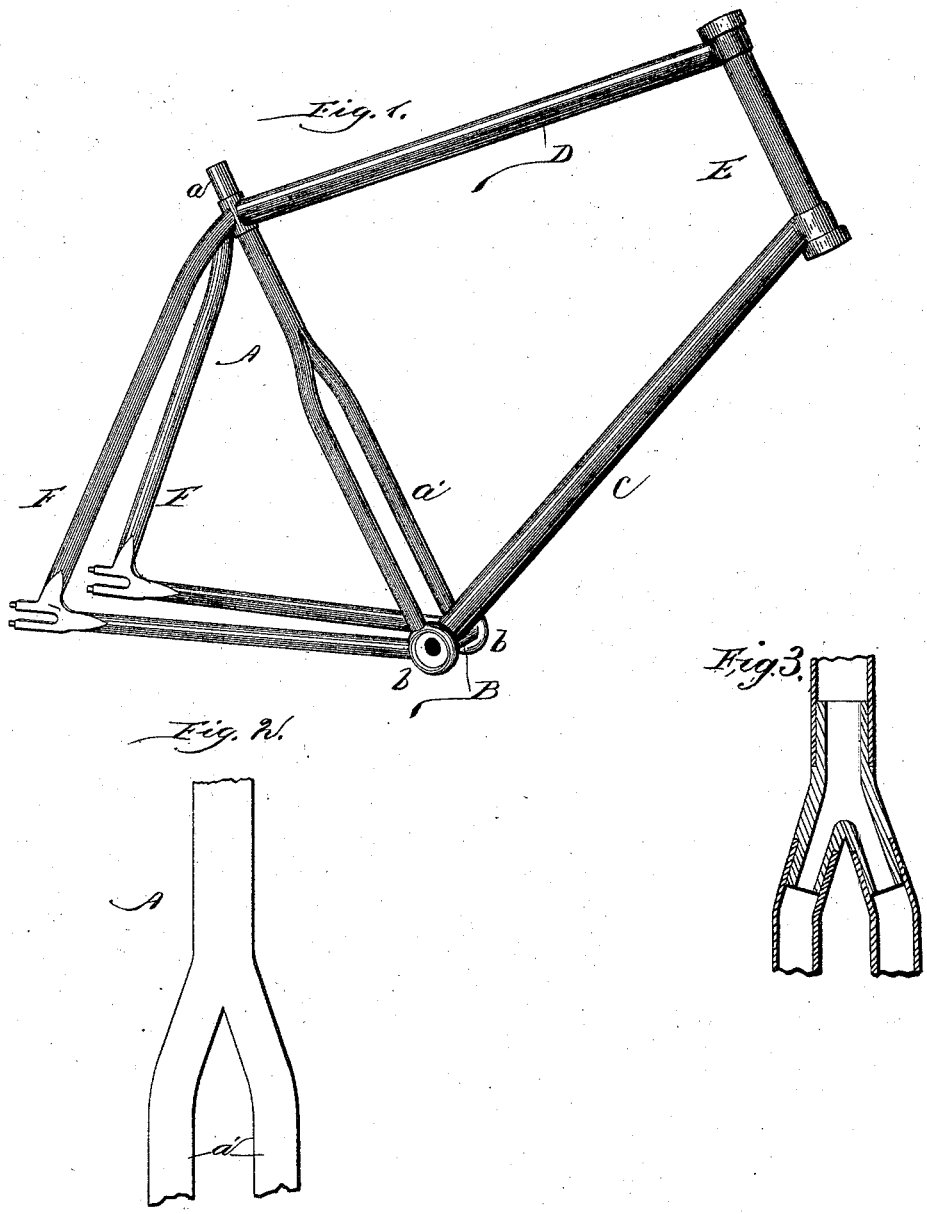

UNITED STATES PATENT OFFICE.

EDWARD M. GRAHAM, OF CHICAGO, ILLINOIS.

BICYCLE-FRAME.

SPECIFICATION forming part of Letters Patent No. 541,811, dated June 25, 1895.

Application filed February 17, 1893. Serial No. 462,668. (No model.)

*To all whom it may concern:*

Be it known that I, EDWARD M. GRAHAM, a citizen of the United States, residing at Chicago, in the county of Cook and State of Illinois, have invented a certain new and useful Improvement in Bicycle-Frames, of which the following is a specification.

The objects of my invention are to provide a light, strong and symmetrical bicycle frame or body; to provide a rigid bearing for the crank axle, to avoid unduly spreading the upright middle portion of the frame and at the same time effectively brace the same, and to provide certain novel and improved details of construction as hereinafter set forth.

In a bicycle frame characterized by my invention, the forward and rear portions of the frame are connected with a seat supporting standard which is forked along its lower portion and which forms the middle upright portion of the frame. The forward portion of the frame is single, that is to say, it comprises one upper and one lower tubular bar secured at their forward ends respectively to the upper and lower portions of the steering post socket or bearing. The rear portion of the frame, to the contrary, is double—that is to say, it comprises a couple of angular or V-shaped sub-frames arranged side by side and each adapted at its apex for engagement with the rear axle. The upper bar of the forward portion of the frame and the upper arms of the rear V-shaped sub-frames unite with the upper straight or unforked portion of the seat standard, which latter forks downwardly from a point below such locality and has the lower ends of its prongs secured to the end portion of a bearing for the crank-axle. The lower arms of the rear V-shaped sub-frames also unite with the said ends of the crank-axle bearing, with which latter the lower bar of the forward portion of the frame also unites, but at a point between the said ends of the bearing to which the fork and lower arms of the rear sub-frames are secured.

In the accompanying drawings, Figure 1 represents in perspective a bicycle-frame embodying my invention. Fig. 2 represents a portion of the middle standard in elevation. Fig. 3 is a section taken longitudinally through a portion of the middle standard.

The seat supporting standard A is arranged between the forward and rear ends of the frame and forms therefore the middle standard of the structure. The upper straight tubular portion $a$ of this standard is adapted to provide a socket for the usual adjustable standard portion for the seat, which need not be herein shown. The lower portion $a'$ of the standard is forked, and has the lower ends of its prongs secured to the flared ends $b$ of a tubular bearing B for the crank-axle.

The forked portion of the standard straddles the rear end of the lower single bar C of the forward portion of the frame, which said bar is secured to the tubular bearing B at a point between the flared ends of the same. The rear end of the upper single bar D of the forward portion of the frame is secured to the upper straight portion of the standard, and these bars C and D are at their forward ends secured respectively to the upper and lower end portions of a head or socket E for the steering post. The rear, double portion of the frame comprises a couple of V-shaped sub-frames F having their upper arms secured to the straight portion of the standard, and their lower arms secured to the flared or enlarged ends of the sprocket axle bearing.

The apex of each V-shaped sub-frame is notched so as to receive the rear axle as usual. The tubular bearing for the sprocket axle is therefore held and steadied at each end, not only by the two rear sub-frames, but by the prongs of the fork, and is further steadied by the lower front bar C. At the same time, this tubular bearing affords a rigid connection between the rear divided portion of the frame, the middle standard, and the lower front bar, and further admits of a compact arrangement whereby the frame is partially divided and braced without unobjectionably spreading it apart.

As a matter of further improvement the lower portions of the legs or prongs of the fork can be parallel with one another or proximately so, but from the point of bifurcation the legs diverge gradually downward until a suitable width is attained, thereby avoiding abrupt bends or angles. The fork is formed by a hollow forked coupling piece G of drop forging which provides a stem for the upper tubular portion $a$ of the standard and legs for the upper portions of the tubular prongs, as in Fig. 3, it being understood that by such arrangement the legs and said upper tubular portion are in the first instance made separate and that after being fitted upon the coupling as illustrated, said parts are united by brazing.

What I claim as my invention is—

A bicycle frame comprising the combination with the steering socket, with the V-shaped sub-frames F, and with the forward lower bar C, of the seat-post or standard A having its lower ends provided with the forked arms $a'$, and the tubular axle bearing B connected to the lower end of the bar C, said axle bearing extending between and having its outer ends rigidly connected to the forward lower ends of the sub-frames F and having its outer ends also rigidly connected to the lower ends of the forked arms $a'$, whereby said tubular axle bearing serves not only to receive the axle but also to rigidly connect the forked arms $a'$ and the front ends of the sub-frames, substantially as described.

EDWARD M. GRAHAM.

Witnesses:
RETA M. WAGNER,
W. D. MIDDLETON.